US012697853B2

(12) United States Patent (10) Patent No.: US 12,697,853 B2
Ko et al. (45) Date of Patent: \*Aug. 4, 2026

(54) AIR-CONDITIONING APPARATUS FOR VEHICLE

(71) Applicant: Hanon Systems, Daejeon (KR)

(72) Inventors: Jae Woo Ko, Daejeon (KR); Ki Jung Park, Daejeon (KR); Ki Man Jeon, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 36 days.

This patent is subject to a terminal disclaimer.

(21) Appl. No.: 18/566,688

(22) PCT Filed: Dec. 21, 2022

(86) PCT No.: PCT/KR2022/020977
§ 371 (c)(1),
(2) Date: Dec. 4, 2023

(87) PCT Pub. No.: WO2023/128456
PCT Pub. Date: Jul. 6, 2023

(65) Prior Publication Data
US 2024/0253420 A1 Aug. 1, 2024

(30) Foreign Application Priority Data

Dec. 29, 2021 (KR) ........................ 10-2021-0190725

(51) Int. Cl.
*B60H 1/00* (2006.01)
(52) U.S. Cl.
CPC ..... *B60H 1/00692* (2013.01); *B60H 1/00021* (2013.01); *B60H 1/00064* (2013.01);
(Continued)

(58) Field of Classification Search
CPC ............ B60H 1/00692; B60H 1/00021; B60H 1/00064; B60H 2001/00092;
(Continued)

(56) References Cited

U.S. PATENT DOCUMENTS 3,683,783 A * 8/1972 Pedrani .............. B60H 1/00042
454/160
4,419,835 A * 12/1983 Strain .................... A45D 20/22
34/100
(Continued)

FOREIGN PATENT DOCUMENTS

DE 102020203213 A1 * 2/2021 ......... B60H 1/00507
DE 102020211558 A1 * 11/2021 ......... B60H 1/00557
(Continued)

OTHER PUBLICATIONS

International Search Report issued in PCT/KR2022/020977 on Mar. 28, 2023.
(Continued)

*Primary Examiner* — Ljiljana V. Ciric
(74) *Attorney, Agent, or Firm* — NORTON ROSE FULBRIGHT US LLP

(57) ABSTRACT

An air-conditioning apparatus for a vehicle is provided, including an air-conditioning case with an inlet portion and a discharge port, and a first partition wall partitioning the inner space thereof into a first space portion and a second space portion, a cooling heat exchanger arranged in the air-conditioning case through the first space portion and the second space portion, and connected to the inlet portion, and a heating heat exchanger arranged in the air-conditioning case through the first space portion and the second space portion, where the air-conditioning case includes a second partition wall which partitions the second space portion into a plurality of space portions, and where a first door is arranged in a third space portion from among the plurality of
(Continued)

space portions and disposed behind the heating heat exchanger.

8 Claims, 10 Drawing Sheets

(52) U.S. Cl.
CPC .............. *B60H 2001/00092* (2013.01); *B60H 2001/00121* (2013.01); *B60H 2001/00135* (2013.01); *B60H 2001/00721* (2013.01)

(58) Field of Classification Search
CPC .... B60H 2001/00121; B60H 2001/002; B60H 2001/00135; B60H 2001/00721; B60H 1/00035; B60H 1/00592; B60H 1/00664; B60H 1/00842
See application file for complete search history.

(56) References Cited

U.S. PATENT DOCUMENTS

| | | | | |
|---|---|---|---|---|
| 4,537,245 A * | 8/1985 | Nishimura | ............. | G05D 23/20 165/203 |
| 4,560,103 A * | 12/1985 | Schulz | ............... | B60H 1/00664 236/13 |
| 4,586,652 A * | 5/1986 | Sakurai | ............. | B60H 1/00842 165/263 |
| 4,690,203 A * | 9/1987 | Iida | .................... | B60H 1/00864 165/204 |
| 4,718,244 A * | 1/1988 | Kobayashi | ........... | B60H 1/3207 236/44 C |
| 4,802,405 A * | 2/1989 | Ichitani | ............. | B60H 1/00842 165/41 |
| 4,899,809 A * | 2/1990 | Takenaka | ........... | B60H 1/00842 236/78 D |
| 4,901,788 A * | 2/1990 | Doi | .................... | B60H 1/00842 165/204 |
| 5,016,704 A * | 5/1991 | Ono | .................. | B60H 1/00064 165/203 |
| 5,156,204 A * | 10/1992 | Doi | .................... | G05D 23/1917 165/204 |
| 5,181,553 A * | 1/1993 | Doi | .................... | B60H 1/00842 165/203 |
| 5,186,237 A * | 2/1993 | Adasek | .............. | B60H 1/00849 165/203 |
| 5,228,475 A * | 7/1993 | Trill | .................. | B60H 1/00692 251/279 |
| 5,601,142 A * | 2/1997 | Hildebrand | ........... | F24F 1/0323 165/137 |
| 5,605,051 A * | 2/1997 | Iritani | ................ | B60H 1/00878 62/507 |
| 5,642,856 A * | 7/1997 | Samukawa | ........ | B60H 1/00864 165/203 |
| 5,687,790 A * | 11/1997 | Trame | ................ | B60H 1/00678 237/12.3 A |
| 5,699,851 A * | 12/1997 | Saida | ................. | B60H 1/00835 454/126 |
| 5,711,368 A * | 1/1998 | Ito | ...................... | B60H 1/00064 237/12.3 A |
| 5,727,731 A * | 3/1998 | Arakawa | ............ | B60H 1/00842 237/12.3 B |
| 5,765,635 A * | 6/1998 | Rhee | .................. | B60H 1/00742 454/189 |
| 5,775,407 A * | 7/1998 | Inoue | ................. | B60H 1/00064 165/203 |
| 5,857,905 A * | 1/1999 | Uemura | ............. | B60H 1/00064 165/42 |
| 5,881,558 A * | 3/1999 | Kawahara | .......... | B60H 1/00692 62/408 |
| 5,884,689 A * | 3/1999 | Takechi | ............. | B60H 1/00021 62/244 |
| 5,890,651 A * | 4/1999 | Kanda | ................ | B60H 1/00064 454/121 |
| 5,934,989 A * | 8/1999 | Yamamoto | ......... | B60H 1/00028 454/156 |
| 6,016,967 A * | 1/2000 | Takechi | ............. | B60H 1/00064 237/12.3 R |
| 6,019,163 A * | 2/2000 | Saida | ................. | B60H 1/00678 454/126 |
| 6,032,723 A * | 3/2000 | Tsuihiji | .............. | B60H 1/00857 454/126 |
| 6,044,656 A * | 4/2000 | Shirota | ................ | B60H 1/0005 62/279 |
| 6,045,444 A * | 4/2000 | Zima | .................. | B60H 1/00028 165/103 |
| 6,048,263 A * | 4/2000 | Uchida | .............. | B60H 1/00842 165/204 |
| 6,110,035 A * | 8/2000 | Uemura | ................ | F04D 25/166 454/139 |
| 6,145,754 A * | 11/2000 | Uemura | ............. | B60H 1/00735 454/126 |
| 6,189,801 B1 * | 2/2001 | Klingler | ............. | B60H 1/00521 237/12.3 B |
| 6,206,092 B1 * | 3/2001 | Beck | .................. | B60H 1/00064 165/203 |
| 6,247,530 B1 * | 6/2001 | Mochizuki | ......... | B60H 1/00064 165/203 |
| 6,270,400 B1 * | 8/2001 | Tsurushima | ....... | B60H 1/00692 454/126 |
| 6,308,770 B1 * | 10/2001 | Shikata | ................. | F28D 1/0478 165/203 |
| 6,311,763 B1 * | 11/2001 | Uemura | ................. | B60H 1/247 62/244 |
| 6,352,102 B1 * | 3/2002 | Takechi | ............. | B60H 1/00849 165/203 |
| 6,382,518 B1 * | 5/2002 | Shibata | .............. | B60H 1/00064 237/12.3 B |
| 6,415,857 B1 * | 7/2002 | Nakamura | ........... | B60H 1/0005 454/162 |
| 6,425,437 B2 * | 7/2002 | Schmadl | ............ | B60H 1/00664 62/244 |
| 6,427,770 B2 * | 8/2002 | Beck | ...................... | F28D 1/0435 165/203 |
| 6,431,257 B1 * | 8/2002 | Sano | .................. | B60H 1/00692 165/42 |
| 6,431,267 B1 * | 8/2002 | Tanaka | .............. | B60H 1/00064 165/204 |
| 6,453,991 B1 * | 9/2002 | Tsurushima | ....... | B60H 1/00064 165/42 |
| 6,568,468 B1 * | 5/2003 | Uemura | ............. | B60H 1/00692 454/126 |
| 6,569,009 B2 * | 5/2003 | Nishikawa | ......... | B60H 1/00692 454/121 |
| 6,578,771 B2 * | 6/2003 | Kaneura | ............ | B60H 1/00828 237/12.3 B |
| 6,581,678 B1 * | 6/2003 | Groemmer | ......... | B60H 1/00064 454/156 |
| 6,598,670 B1 * | 7/2003 | Hashimoto | ........ | B60H 1/00028 165/204 |
| 6,622,787 B1 * | 9/2003 | Toyoshima | ........ | B60H 1/00064 165/203 |
| 6,644,559 B2 * | 11/2003 | Kondo | ............... | B60H 1/00064 237/12.3 B |
| 6,688,964 B2 * | 2/2004 | Uemura | ............. | B60H 1/00692 454/121 |
| 6,695,691 B1 * | 2/2004 | Le | ...................... | B60H 1/00692 454/126 |
| 6,782,944 B2 * | 8/2004 | Kim | .................. | B60H 1/00064 165/203 |
| 6,814,137 B2 * | 11/2004 | Tsurushima | ....... | B60H 1/00064 165/203 |
| 6,814,138 B2 * | 11/2004 | Tsurushima | ....... | B60H 1/00692 165/81 |
| 6,871,696 B2 * | 3/2005 | Aoki | .................. | B60H 1/00285 165/203 |
| 6,881,140 B2 * | 4/2005 | Le | ...................... | B60H 1/00678 165/41 |

(56) References Cited

U.S. PATENT DOCUMENTS

| | | | | |
|---|---|---|---|---|
| 6,886,630 | B2 * | 5/2005 | Onda | B60H 1/00028 62/244 |
| 6,991,027 | B2 * | 1/2006 | Ozeki | B60H 1/0005 165/203 |
| 6,994,157 | B1 * | 2/2006 | Arold | B60H 1/00064 165/203 |
| 7,013,967 | B2 * | 3/2006 | Kondo | B60H 1/00064 165/203 |
| 7,048,036 | B2 * | 5/2006 | Han | B60H 1/00028 237/12.3 A |
| 7,074,122 | B2 * | 7/2006 | Haupt | B60H 1/0005 454/261 |
| 7,159,651 | B2 * | 1/2007 | Ito | B60H 1/12 165/203 |
| 7,281,574 | B2 * | 10/2007 | Shibata | B60H 1/00678 165/203 |
| 7,625,273 | B2 * | 12/2009 | Komowski | B60H 1/00678 454/126 |
| 7,726,391 | B2 * | 6/2010 | Seo | B60H 1/00064 454/126 |
| 7,857,041 | B2 * | 12/2010 | Fukagawa | B60H 1/00842 454/126 |
| 7,967,063 | B2 * | 6/2011 | Sato | B60H 1/00842 454/156 |
| 8,302,674 | B2 * | 11/2012 | Kim | B60H 1/00064 55/309.1 |
| 8,840,452 | B2 * | 9/2014 | Han | B60H 1/00692 454/145 |
| 9,180,751 | B2 * | 11/2015 | Han | B60H 1/00692 |
| 9,221,318 | B2 * | 12/2015 | Uemura | B60H 1/00849 |
| 9,248,719 | B2 * | 2/2016 | Kang | B60H 1/00064 |
| 9,446,654 | B2 * | 9/2016 | Yamamoto | B60H 1/00064 |
| 9,610,822 | B2 * | 4/2017 | Takahashi | B60H 1/00057 |
| 9,623,718 | B2 * | 4/2017 | Harke | B60H 1/039 |
| 9,649,907 | B2 * | 5/2017 | Kakizaki | B60H 1/00064 |
| 9,776,471 | B2 * | 10/2017 | Liu | B60H 1/00864 |
| 9,802,463 | B2 * | 10/2017 | Maeda | B60H 1/00678 |
| 9,844,994 | B2 * | 12/2017 | Byon | B60H 1/00035 |
| 9,931,905 | B2 * | 4/2018 | Takahashi | B60H 1/00057 |
| 9,937,768 | B2 * | 4/2018 | Sakakibara | B60H 1/00564 |
| 10,017,027 | B2 * | 7/2018 | Haraguchi | B60H 1/00064 |
| 10,040,333 | B2 * | 8/2018 | Shin | B60H 1/00899 |
| 10,052,934 | B2 * | 8/2018 | Dorland | B60H 1/00685 |
| 10,065,477 | B2 * | 9/2018 | Sekito | B60H 1/00064 |
| 10,086,674 | B2 * | 10/2018 | Gilley | F28D 1/047 |
| 10,144,268 | B2 * | 12/2018 | Makimoto | B60H 1/00835 |
| 10,155,427 | B2 * | 12/2018 | Aizawa | B60H 1/00864 |
| 10,272,735 | B2 * | 4/2019 | Shin | B60H 1/08 |
| 10,279,651 | B2 * | 5/2019 | Blowytsky | B60H 1/00671 |
| 10,286,749 | B2 * | 5/2019 | Jung | B60H 1/00064 |
| 10,350,962 | B2 * | 7/2019 | Wiesmann | B60H 1/0005 |
| 10,369,862 | B2 * | 8/2019 | Yamaoka | B60H 1/00678 |
| 10,406,885 | B2 * | 9/2019 | Rippel | B60H 1/00021 |
| 10,427,489 | B2 * | 10/2019 | Lee | B60H 1/00692 |
| 10,457,115 | B2 * | 10/2019 | Lee | B60H 1/00057 |
| 10,479,161 | B2 * | 11/2019 | Ryu | B60H 1/32 |
| 10,513,162 | B2 * | 12/2019 | Sakaguchi | B60H 1/00207 |
| 10,518,603 | B2 * | 12/2019 | Kim | B60H 1/00671 |
| 10,538,142 | B2 * | 1/2020 | Won | B60H 1/00685 |
| 10,611,207 | B2 * | 4/2020 | Ryu | B60H 1/22 |
| 10,661,635 | B2 * | 5/2020 | Maeda | B60H 1/3227 |
| 10,696,125 | B2 * | 6/2020 | Ito | B60H 1/034 |
| 10,696,126 | B2 * | 6/2020 | Kato | B60H 1/00 |
| 10,766,336 | B2 * | 9/2020 | Fujii | B60H 1/0055 |
| 10,864,802 | B2 * | 12/2020 | Kakizaki | B60H 1/00564 |
| 11,052,726 | B2 * | 7/2021 | Ryu | B60H 1/00828 |
| 11,254,187 | B2 * | 2/2022 | Maeda | B60H 1/12 |
| 11,267,311 | B2 * | 3/2022 | Suzuki | B60H 1/00064 |
| 11,292,312 | B2 * | 4/2022 | Lee | B60H 1/00028 |
| 11,299,005 | B2 * | 4/2022 | Kim | B60H 1/00064 |
| 11,390,142 | B2 * | 7/2022 | Haupt | B60H 1/00685 |
| 11,407,271 | B2 * | 8/2022 | Tashima | B60H 1/345 |
| 11,511,594 | B2 * | 11/2022 | Yonezu | B60H 1/0005 |
| 11,554,630 | B2 * | 1/2023 | Maeda | B60H 1/00828 |
| 11,623,496 | B2 * | 4/2023 | Kang | B60H 1/00692 454/121 |
| 11,628,703 | B2 * | 4/2023 | Hayes | B60H 1/00064 165/42 |
| 11,642,934 | B2 * | 5/2023 | Han | B60H 1/00671 454/120 |
| 11,654,742 | B2 * | 5/2023 | Schnaidt | B60H 1/0005 454/69 |
| 11,691,480 | B2 * | 7/2023 | Pierres | B60H 3/0616 165/42 |
| 11,774,149 | B2 * | 10/2023 | Nishida | F25B 47/02 62/156 |
| 11,787,264 | B2 * | 10/2023 | Lee | B60H 1/00842 165/204 |
| 11,872,868 | B2 * | 1/2024 | Haupt | B60H 1/00021 |
| 11,912,102 | B2 * | 2/2024 | Lee | B60H 1/0005 |
| 12,023,981 | B2 * | 7/2024 | LaCross | B60H 1/00071 |
| 12,030,363 | B2 * | 7/2024 | Maeng | B60H 1/00842 |
| 12,077,032 | B2 * | 9/2024 | Ozaki | B60H 1/12 |
| 12,083,853 | B2 * | 9/2024 | Yeon | B60H 1/00064 |
| 12,263,772 | B2 * | 4/2025 | Jung | F25D 23/10 |
| 12,280,638 | B2 * | 4/2025 | Pierres | B60H 1/00535 |
| 2003/0000691 | A1 * | 1/2003 | Kim | B60H 1/00064 165/203 |
| 2007/0125521 | A1 * | 6/2007 | Itou | B60H 1/00328 165/300 |
| 2009/0117841 | A1 * | 5/2009 | Goto | B60H 1/00064 454/127 |
| 2010/0043470 | A1 * | 2/2010 | Kang | B60H 1/00064 62/239 |
| 2011/0005719 | A1 * | 1/2011 | Seto | B60H 1/00064 165/61 |
| 2011/0005730 | A1 * | 1/2011 | Habasita | B60H 1/00521 165/121 |
| 2016/0303941 | A1 * | 10/2016 | Kinmartin | B60H 1/00064 |
| 2018/0312028 | A1 * | 11/2018 | Rippel | B60H 1/00464 |
| 2019/0375272 | A1 * | 12/2019 | Kim | B60H 1/12 |
| 2021/0053414 | A1 * | 2/2021 | Lee | B60H 1/00028 |
| 2023/0234420 | A1 * | 7/2023 | Pierres | B60H 1/00028 |

FOREIGN PATENT DOCUMENTS

| | | | | |
|---|---|---|---|---|
| JP | 2005-313892 | A | 11/2005 | |
| JP | 2007182206 | A * | 7/2007 | F28F 27/02 |
| JP | 2007245957 | A * | 9/2007 | |
| JP | 3994503 | B2 * | 10/2007 | |
| KR | 10-0665050 | B1 | 1/2007 | |
| KR | 10-0759425 | B1 | 9/2007 | |
| KR | 10-1241778 | B1 | 3/2013 | |
| KR | 1020180001697 | | 1/2018 | |

OTHER PUBLICATIONS

English translation of Official Action issued Apr. 18, 2025 in related Korean Patent Application No. KR 10-2021-0190725, 15 pgs.

* cited by examiner

AIR-CONDITIONING APPARATUS FOR VEHICLE

CROSS REFERENCE TO RELATED APPLICATIONS

This patent application is a national phase under 35 U.S.C. § 371 of International Patent Application No. PCT/KR2022/020977 filed Dec. 21, 2022, which claims the benefit of priority from Korean Patent Application Nos. 10-2021-0190725 filed Dec. 29, 2021, each of which is hereby incorporated herein by reference in its entirety for all purposes.

TECHNICAL FIELD

Embodiments relate to an air-conditioning apparatus for a vehicle.

BACKGROUND ART

An air-conditioning apparatus for a vehicle emits cooled or heated air to a vehicle interior. The air-conditioning apparatus for a vehicle may supply air to the vehicle interior according to a plurality of air-conditioning modes (e.g., a vent mode, a bi-mode, a floor mode, a mix mode, and a defrost mode).

When the vehicle interior is heated, cold outside air is introduced to prevent frost on a window glass. However, when the cold outside air is supplied to the interior, there is a problem in that the interior air temperature of the vehicle is lowered. Therefore, there is an air-conditioning apparatus capable of the supply of a dual-layer flow in which outside air is supplied to the window glass of the vehicle and indoor air is supplied to the vehicle interior.

In the air-conditioning apparatus for the supply of the dual-layer flow, a case is divided into an upper space and a lower space, air is supplied from the upper space to a vehicle window and the like through an outlet disposed at the upper space, and air is supplied from the lower space to an interior floor of the vehicle through an outlet disposed at the lower space.

At this time, a portion of the lower space disposed behind a heating heat exchanger may communicate with a rear seat side of the vehicle so that air may be supplied to a rear seat of the vehicle. Cold air not passing through the heating heat exchanger may flow into a portion of the lower space through a flow path disposed under the heating heat exchanger, and the cold air may be supplied to the rear seat of the vehicle.

The portion of the lower space is partitioned from another lower space through a partition wall. Therefore, the heat behind the heating heat exchanger remains in the portion of the lower space. As a result, there is a problem in that the air flowing along the flow path disposed under the heating heat exchanger picks up the heat (heat pick up) remaining behind the heating heat exchanger and is supplied to the rear seat of the vehicle, and thus a temperature of the air flowing to the rear seat of the vehicle is relatively higher.

DISCLOSURE

Technical Problem

The present invention is directed to providing an air-conditioning apparatus for a vehicle capable of preventing a temperature of air flowing into a rear seat of the vehicle from being relatively increased by air that flows along a flow path disposed under a heating heat exchanger and picks up heat remaining behind the heating heat exchanger.

The object of the present invention is not limited to the above-described object, and other objects that are not described will be able to be clearly understood by those skilled in the art from the following description.

Technical Solution

An embodiment provides an air-conditioning apparatus for a vehicle including an air-conditioning case including an inlet, an outlet, and a first partition wall configured to partition an inner space into a first space portion and a second space portion, a cooling heat exchanger disposed inside the air-conditioning case and connected to the inlet to be disposed to cross the first space portion and the second space portion, and a heating heat exchanger disposed inside the air-conditioning case to be disposed to cross the first space portion and the second space portion, wherein the air-conditioning case includes a second partition wall configured to partition the second space portion into a plurality of space portions, the air-conditioning case includes a first door disposed in a third space portion among the plurality of space portions and disposed behind the heating heat exchanger, and the first door adjusts an opening amount of the heating heat exchanger in the third space portion.

The air-conditioning case may include a second door disposed in front of the heating heat exchanger in the second space portion, and the first door and the second door may be connected to one driving unit to move together.

The air-conditioning case may include a first flow path which is disposed under the heating heat exchanger and through which air not passing through the heating heat exchanger flows.

When the second door fully opens a front of the heating heat exchanger and closes the first flow path, the first door may fully open a rear of the heating heat exchanger.

When the second door fully closes the front of the heating heat exchanger and fully opens the first flow path, the first door may be controlled so that the first door fully opens the rear of the heating heat exchanger.

When the second door partially closes a front of the heating heat exchanger and partially opens the first flow path, the first door may partially open a rear of the heating heat exchanger.

The plurality of space portions may include the third space portion, a fourth space portion, and a fifth space portion, which are partitioned in a left-right direction, and the third space portion may be disposed between the fourth space portion and the fifth space portion.

The first door may be disposed to adjust the opening amount of the first flow path together with the opening amount behind the heating heat exchanger in the third space portion.

The first door may include a first shaft portion and a door body coupled to be rotated about the first shaft portion, and the door body may include an upper surface, a lower surface, and a side surface connecting the upper surface to the lower surface to form an accommodating space therein.

An embodiment provides an air-conditioning apparatus for a vehicle including an air-conditioning case including an inlet and a plurality of outlets, a cooling heat exchanger disposed inside the air-conditioning case and connected to the inlet, and a heating heat exchanger disposed inside the air-conditioning case, wherein the air-conditioning case includes a first flow path through which air not passing through the heating heat exchanger flows, a third space portion disposed behind the heating heat exchanger, communicating with the first flow path, partitioned from an inner space of the air-conditioning case, and communicating with some of the plurality of outlets, and a third door disposed in the third space portion, and the third door is disposed behind the heating heat exchanger and adjusts an opening amount of the first flow path and an opening amount behind the heating heat exchanger together.

An embodiment provides an air-conditioning apparatus for a vehicle including an air-conditioning case including an inlet, an outlet, and a first partition wall configured to partition an inner space into a first space portion and a second space portion, a cooling heat exchanger disposed inside the air-conditioning case and connected to the inlet to be disposed to cross the first space portion and the second space portion, and a heating heat exchanger disposed inside the air-conditioning case to be disposed to cross the first space portion and the second space portion, wherein the air-conditioning case includes a first flow path which is disposed under the heating heat exchanger and through which air not passing through the heating heat exchanger flows and a first door disposed behind the heating heat exchanger, and the first door closes a rear of the heating heat exchanger to prevent air passing through the first flow path from flowing to the rear of the heating heat exchanger.

Advantageous Effects

According to embodiments, there is an advantage in that, by blocking a rear side of a heating heat exchanger through a first door, a temperature of air flowing to a rear seat of the vehicle is prevented from being relatively increased by air that flows along a first flow path disposed under a heating heat exchanger and picks up heat remaining behind the heating heat exchanger.

According to the embodiments, there is an advantage in that it is easy to control a temperature of the air behind the heating heat exchanger by adjusting the opening amount behind the heating heat exchanger and the opening amount of the first flow path together.

MODES OF THE INVENTION

Hereinafter, exemplary embodiments of the present invention will be described in detail with reference to the accompanying drawings. The objects, specific advantages, and novel features of the present invention will become more apparent from the following detailed description and exemplary embodiments taken in conjunction with the accompanying drawings. In addition, in describing the present invention, detailed descriptions of related known technologies that may unnecessarily obscure the gist of the present invention are omitted.

Terms including ordinal numbers such as first and second may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

Figure 1:
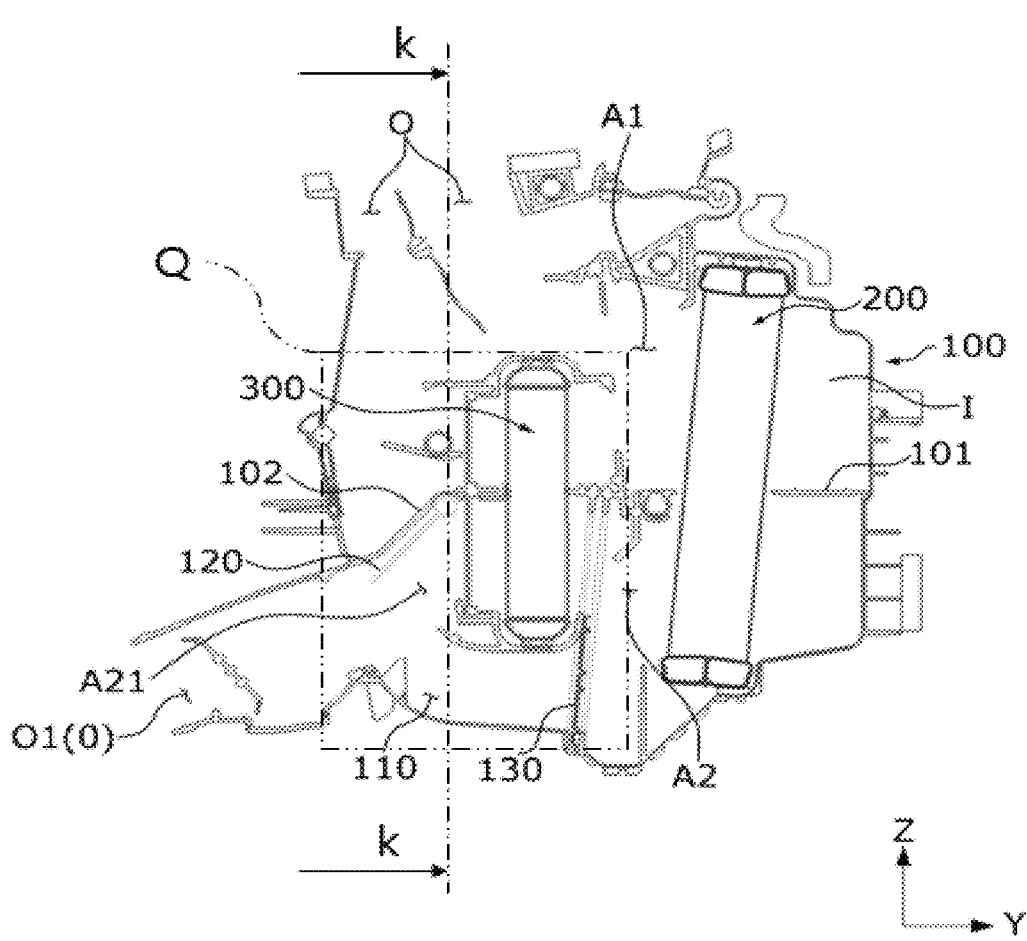
FIG. 1 is a view illustrating an air-conditioning apparatus for a vehicle according to an embodiment.
Figure 2:
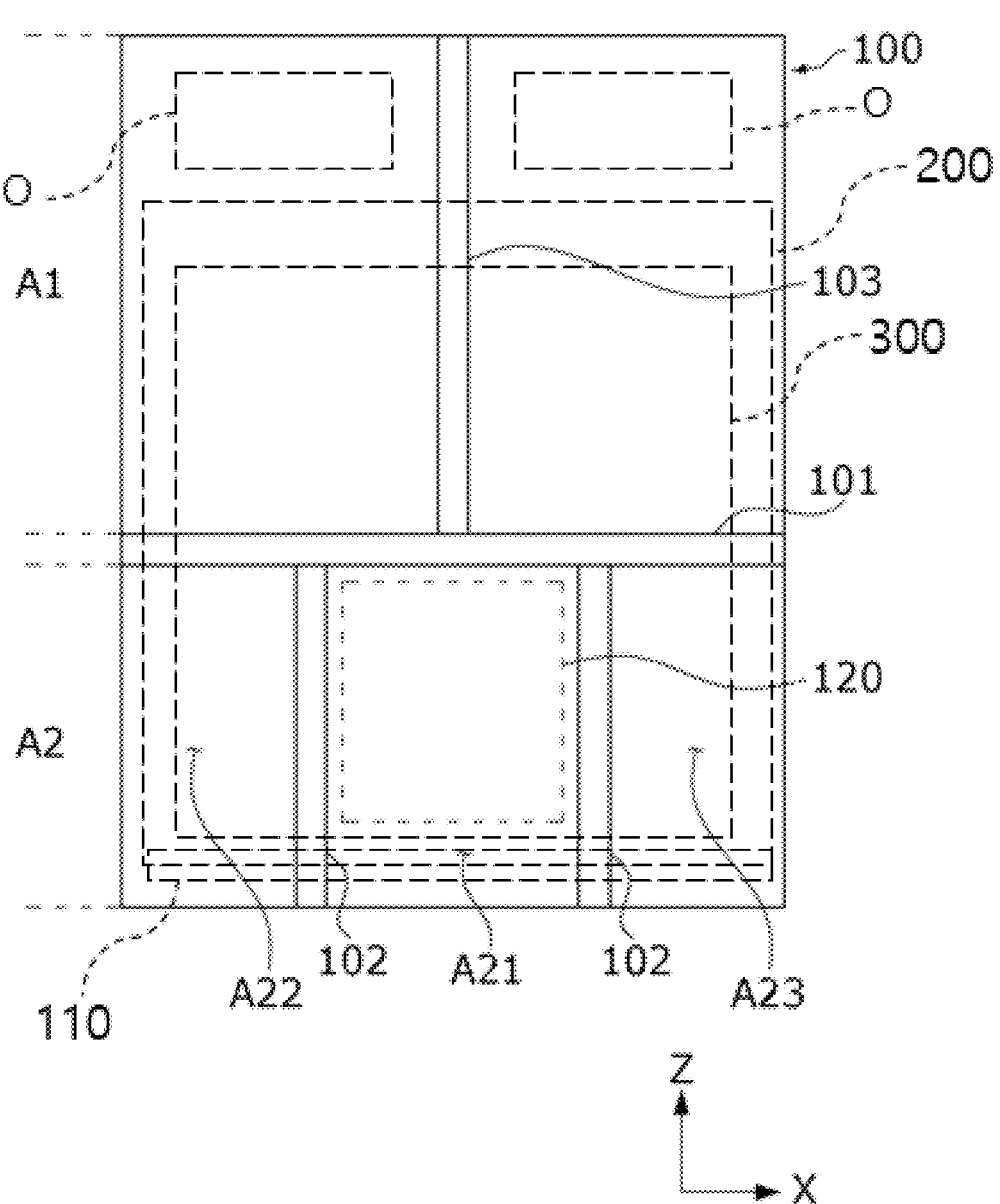
FIG. 2 is a conceptual diagram illustrating the interior space of a vehicle as viewed from the direction indicated by reference symbol k in FIG. 1.

FIG. 1 is a view illustrating an air-conditioning apparatus for a vehicle according to an embodiment, and FIG. 2 is a conceptual diagram illustrating the interior space of a vehicle as viewed from the direction indicated by reference symbol k in FIG. 1. Hereinafter, in the drawings, an X-axis direction represents a left-right direction of an air-conditioning apparatus for a vehicle, a Y-axis direction represents a front-rear direction of the air-conditioning apparatus for a vehicle, and a Z-axis direction represents a vertical direction of the air-conditioning apparatus for a vehicle. Hereinafter, terms "front" and "rear" are based on the front-rear direction, and terms "above" and "under" are based on the vertical direction.

Referring to FIGS. 1 and 2, the air-conditioning apparatus for a vehicle according to the embodiment includes an air-conditioning case 100. The air-conditioning case 100 includes an inlet I and an outlet O. The inlet I and the outlet O may be provided as a plurality of inlets and outlets. Air flowing into the inlet I is discharged through the outlet O after an amount or a discharge direction of the air is adjusted. The air flowing into the inlet I may be provided from the outside of the vehicle or provided from the inside of the vehicle, or may be a combination thereof.

A cooling heat exchanger 200 and a heating heat exchanger 300 may be disposed inside the air-conditioning case 100. The cooling heat exchanger 200 is connected to the inlet I. Air passing through the cooling heat exchanger 200 is cooled, and air passing through the heating heat exchanger 300 is heated. The heating heat exchanger 300 may be disposed behind the cooling heat exchanger 200.

The air-conditioning case 100 may include a first partition wall 101 for partitioning the inner space into a first space portion A1 and a second space portion A2. The first space portion A1 may be disposed above the partition wall 101 to form an upper space of the air-conditioning case 100, and the second space portion A2 may be disposed under the partition wall 101 to form a lower space of the air-conditioning case 100.

The cooling heat exchanger 200 and the heating heat exchanger 300 may be disposed to cross the partition wall 101.

The inlet I is divided into upper and lower portions by the partition wall 101. A blower (not illustrated) for blowing inside air or outside air toward the air-conditioning case 100 may be provided at the inlet I side.

The outlet O may be a floor outlet, a vent outlet, or a defrost outlet. The floor outlet may include a first outlet O1 connected to a rear seat side of the vehicle.

The first space portion A1 may be divided into a left space and a right space through a third partition wall 103.

The second space portion A2 may include a third space portion A21, a fourth space portion A22, and a fifth space portion A23. The third space portion A21, the fourth space portion A22, and the fifth space portion A23 are formed by being partitioned in the left-right direction. The third space portion A21 may be disposed between the fourth space portion A22 and the fifth space portion A23 in the left-right direction.

The third space portion A21 is a space partitioned from other spaces of the second space portion A2 by a second partition wall 102. The third space portion A21 may be disposed to cross the left space and the right space of the first space portion A1 in the left-right direction.

The air-conditioning case 100 includes a first flow path 110. The first flow path 110 is disposed behind the cooling heat exchanger 200 and disposed under the heating heat exchanger 300. Air passing through the cooling heat exchanger 200 may move to the first outlet O1 through the first flow path 110 without passing through the heating heat exchanger 300.

The air-conditioning case 100 may include a first door 130 and a second door 140.

The first door 120 is disposed in the third space portion A21. In addition, the first door 120 is disposed behind the heating heat exchanger 300. The first door 120 adjusts the opening amount of the heating heat exchanger 300 in the third space portion A21.

The second door 130 is disposed in front of the heating heat exchanger 300. The second door 130 is disposed to reciprocate linearly and adjusts the opening amount of the first flow path 110 together the opening amount of the front of the heating heat exchanger 300.

Figure 3:
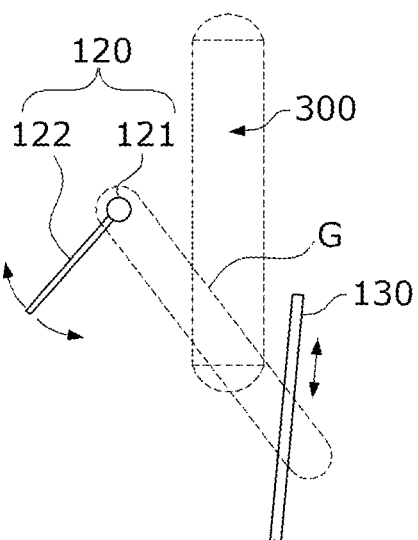
FIG. 3 is an operational diagram illustrating the interlocking process of the first door and the second door shown at reference symbol Q in FIG. 1.

FIG. 3 is an operational diagram illustrating the interlocking process of the first door and the second door shown at reference symbol Q in FIG. 1.

Referring to FIG. 3, the first door 120 and the second door 130 may be connected to one driving unit G to move together. The driving unit G may include a motor and a power transmission device such as a rack gear and a rack bar for transmitting a rotational force of the motor to the second door 130. In addition, the power transmission device may include an arm, a lever, a cam, or the like for transmitting the rotational force of the motor to the first door 120 as well.

The first door 120 and the second door 130 may be interworked as follows.

Figure 4:
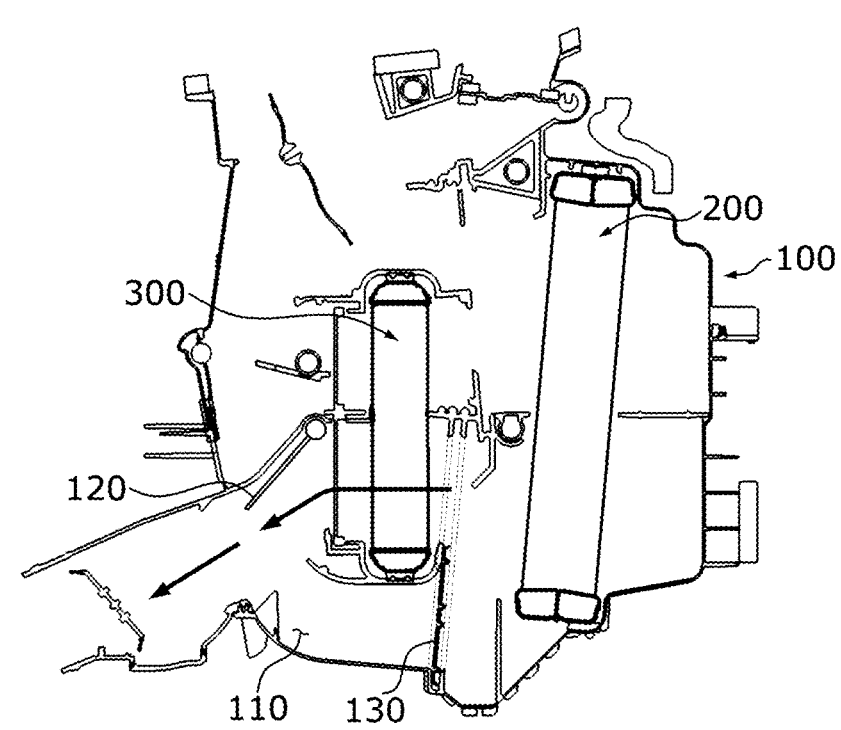
FIG. 4 is a view illustrating the first door and the second door in a max-warm state.

FIG. 4 is a view illustrating the first door and the second door in a max-warm state.

Referring to FIG. 4, in the max-warm state in which warm air is sent to the first outlet O1, the first door 120 fully opens behind the heating heat exchanger 300. In addition, the second door 130 closes the first flow path 110 and fully opens the front of the heating heat exchanger 300. The air passing through the cooling heat exchanger is heated while passing through the heating heat exchanger 300 and flows toward the first outlet O1.

Figure 5:
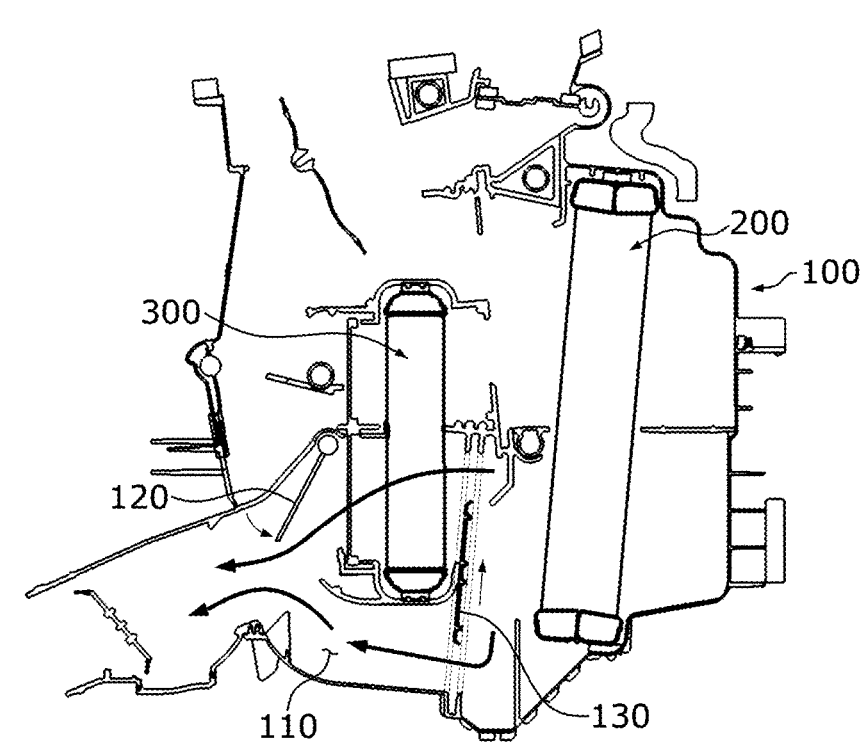
FIG. 5 is a view illustrating the first door and the second door in an intermediate state between the max-warm state and a max-cool state.

FIG. 5 is a view illustrating the first door 120 and the second door 130 in an intermediate state between the max-warm state and a max-cool state.

Referring to FIG. 5, in the intermediate state between the max-warm state and the max-cool state in which mixed warm air and cold air are sent to the first outlet O1, the first door 120 partially opens a rear of the heating heat exchanger 300. In addition, the second door 130 partially opens the first flow path 110 and partially opens the front of the heating heat exchanger 300. A portion of the air passing through the cooling heat exchanger is heated while passing through the heating heat exchanger 300 and flows behind the heating heat exchanger 300. The remaining portion of the air passing through the cooling heat exchanger flows behind the heating heat exchanger 300 through the first flow path 110 without passing through the heating heat exchanger 300.

The warm air passing through the heating heat exchanger 300 and the cold air passing through the first flow path 110 are mixed and discharged through the first outlet.

Figure 6:
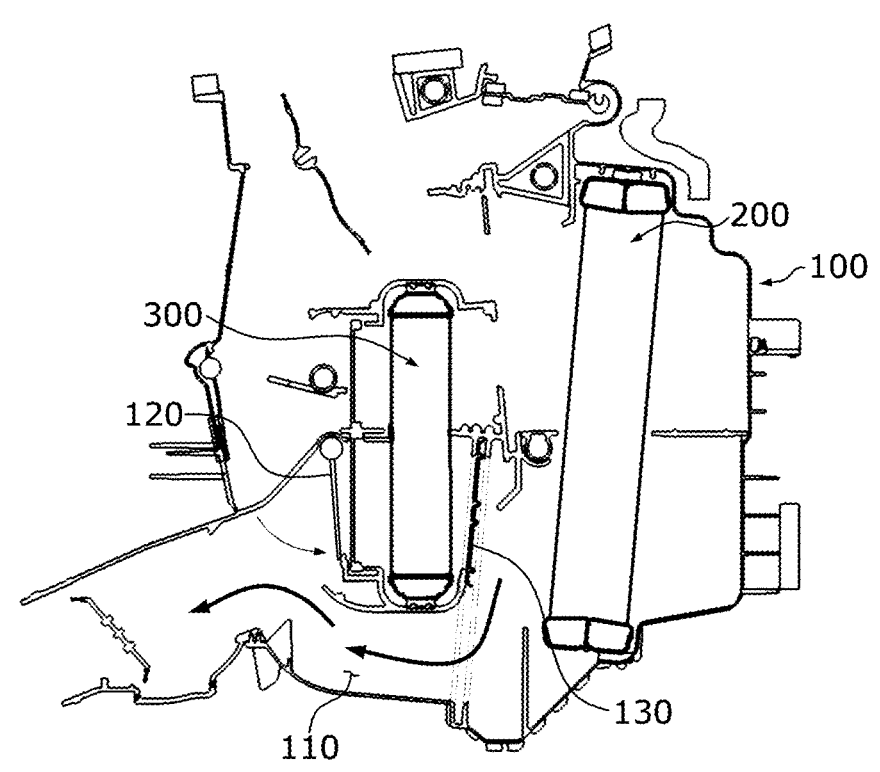
FIG. 6 is a view illustrating the first door and the second door in the max-cool state.

FIG. 6 is a view illustrating the first door 120 and the second door 130 in the max-warm state.

Referring to FIG. 6, in the max-cool state in which cold air is sent to the first outlet O1, the first door 120 fully closes the rear of the heating heat exchanger 300. In addition, the second door 130 closes the front of the heating heat exchanger 300 and fully opens the first flow path 110.

All of the air passing through the cooling heat exchanger 200 passes through the first flow path 110 and flows behind the heating heat exchanger 300 without passing through the heating heat exchanger 300. At this time, since the first door 120 closes the rear of the heating heat exchanger 300, the air passing through the first flow path 110 cannot be in a heat pick up state in which heat remaining near the heating heat exchanger 300 is picked up.

The air passing through the first flow path 110 may be discharged through the first outlet O1 while maintaining a low temperature.

Figure 7:
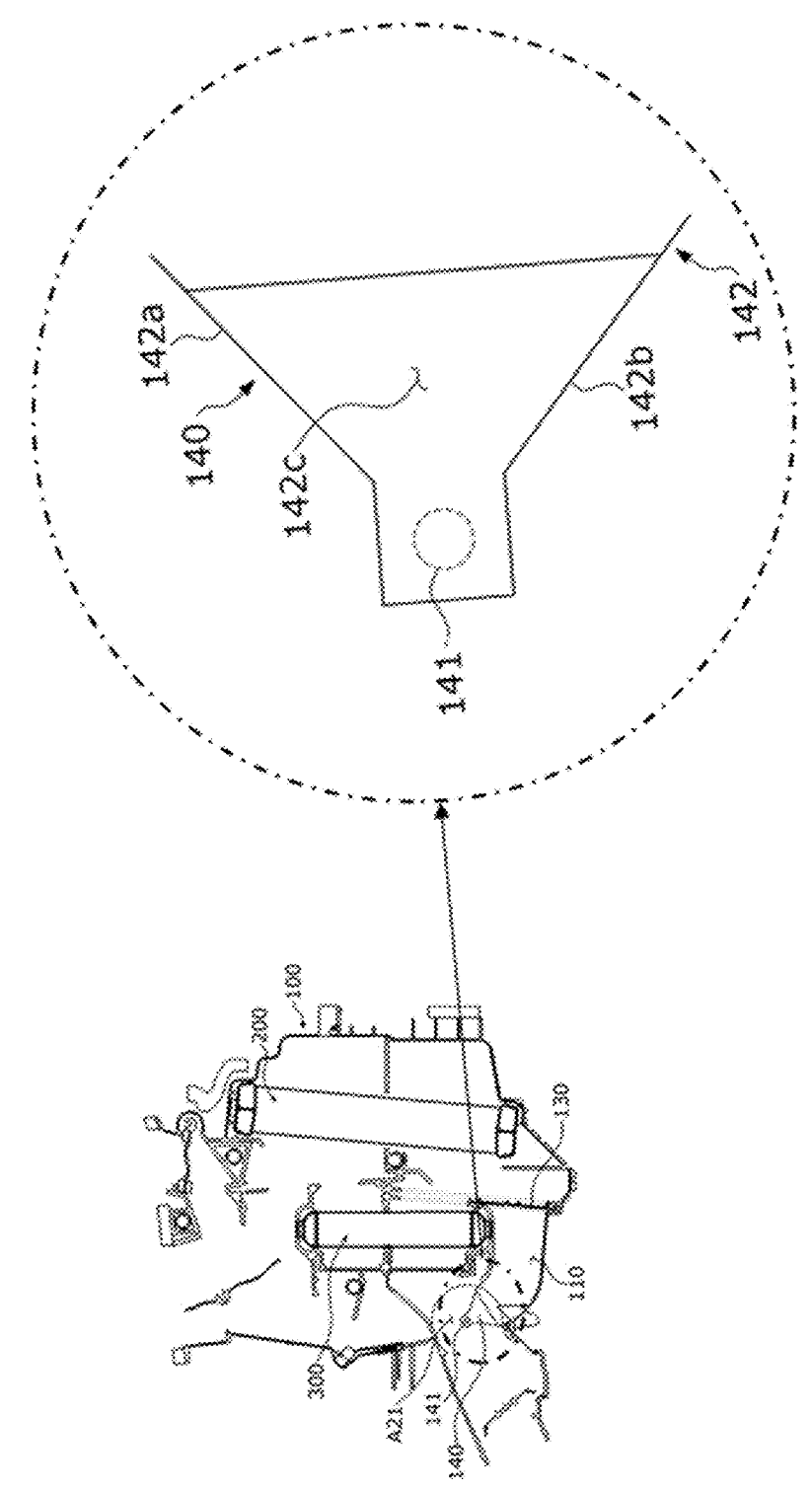
FIG. 7 is a view illustrating a first door according to a modified example.

FIG. 7 is a view illustrating a first door 140 according to a modified example.

Referring to FIG. 7, the first door 140 according to the modified example is disposed to adjust the opening amount of the first flow path 110 together with the opening amount behind the heating heat exchanger 300 in the third space portion A21. The first door 140 may include a first shaft portion 141 and a door body 142 coupled to be rotated about the first shaft portion 141.

The door body 142 may have a dome shape formed of an upper surface 142a, a lower surface 142b, and side surfaces 142c that form an accommodating space therein.

Figure 8:
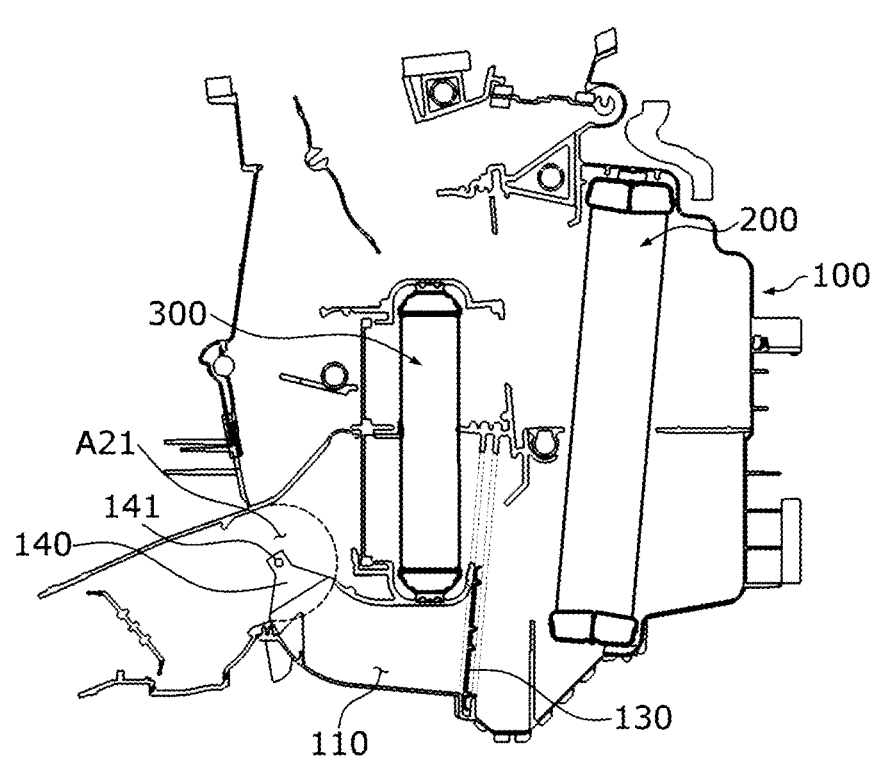
FIG. 8 is a view illustrating the first door illustrated in FIG. 7 in the max-warm state.

FIG. 8 is a view illustrating the first door 140 illustrated in FIG. 7 in the max-warm state.

Referring to FIG. 8, in the max-warm state, an edge of an upper surface 142a and an edge of a lower surface 142b of the first door 140 may block the periphery of an edge that connects the first flow path 110 and the third space portion A21 to close the first flow path 110. The air passing through the cooling heat exchanger is heated while passing through the heating heat exchanger 300 and flows toward the first outlet O1.

Figure 9:
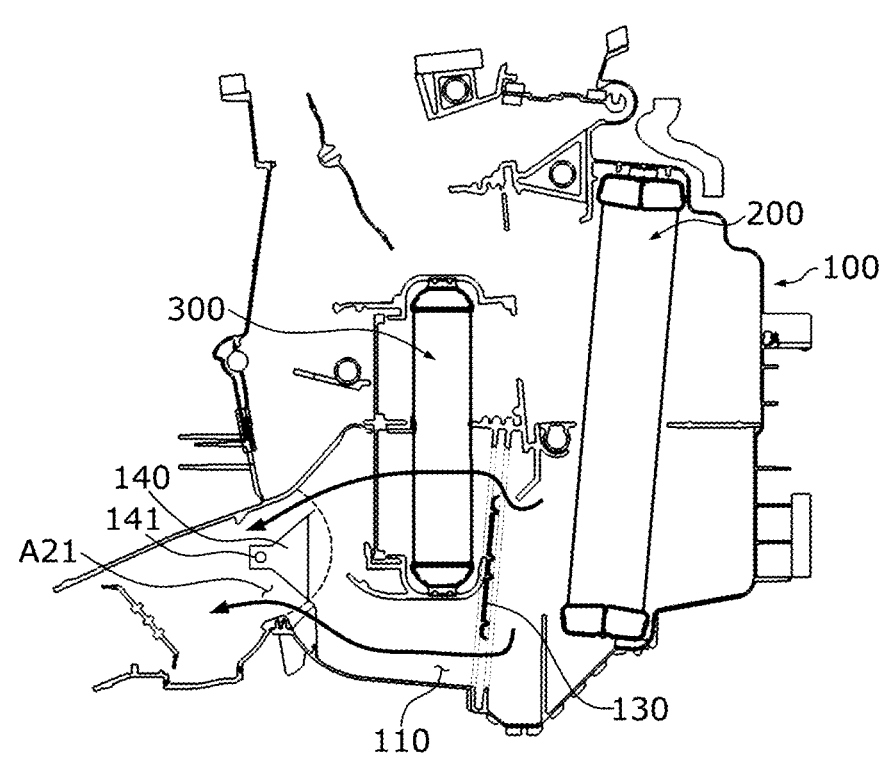
FIG. 9 is a view illustrating the first door illustrated in FIG. 7 in the intermediate state between the max-warm state and the max-cool state.

FIG. 9 is a view illustrating the first door 140 illustrated in FIG. 7 in the intermediate state between the max-warm state and the max-cool state.

Referring to FIG. 9, in the intermediate state between the max-warm state and the max-cool state, the first door 140 partially opens the rear of the heating heat exchanger 300. In addition, the first door 140 partially opens the first flow path 110 together. As described above, since the opening amount at an outlet side of the first flow path 110 together with the opening amount behind the heating heat exchanger 300 is adjusted, there is an advantage it that it is easy to control the temperature of the air discharged through the first outlet O1.

Figure 10:
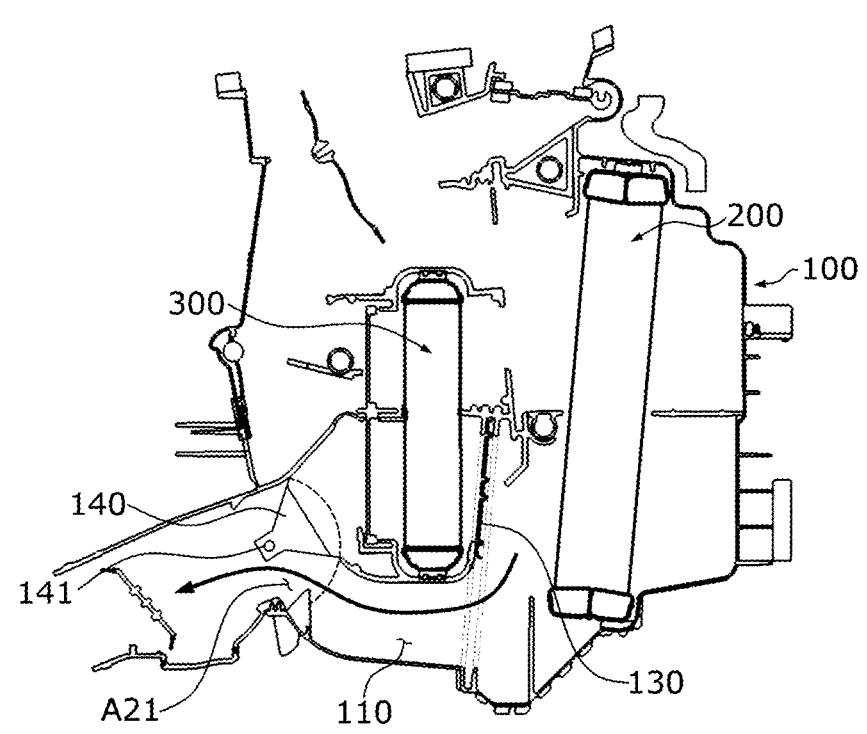
FIG. 10 is a view illustrating the first door and the second door in the max-cool state.

FIG. 10 is a view illustrating the first door 140 and the second door 130 in the max-cool state.

Referring to FIG. 10, in the max-cool state, the first door 140 fully closes the rear of the heating heat exchanger 300. In addition, the first door 140 fully opens the outlet side of the first flow path 110. All of the air passing through the cooling heat exchanger 200 passes through the first flow path 110 and flows behind the heating heat exchanger 300 without passing through the heating heat exchanger 300. At this time, since the first door 140 closes the rear of the heating heat exchanger 300, the air passing through the first flow path 110 cannot be in a heat pick up state in which heat remaining near the heating heat exchanger 300 is picked up.

Since the first door 140 has a greater rotational displacement than the first door 120 having a plate shape illustrated in FIG. 1 has, it is advantageous to variously control the temperature of the air discharged through the first outlet O1.

The air-conditioning apparatus for a vehicle according to one exemplary embodiment of the present invention has been described above in detail with reference to the accompanying drawings.

The above-described one embodiment of the present invention should be understood as illustrative and not restrictive in all respects, and the scope of the present invention will be determined by the claims to be described below rather than the above-described detailed description. In addition, not only the meanings and scopes of the claims but also all changeable or modifiable forms derived from the equivalent concept thereof should be construed as being included in the scope of the present invention.

What is claimed is:

1. An air-conditioning apparatus for a vehicle, comprising:
  an air-conditioning case including an inlet, an outlet, and a first partition wall configured to partition an inner space into a first space portion and a second space portion;
  a cooling heat exchanger disposed inside the air-conditioning case and crossing the first space portion and the second space portion; and
  a heating heat exchanger disposed inside the air-conditioning case and crossing the first space portion and the second space portion,
  wherein the air-conditioning case includes a second partition wall configured to partition the second space portion into a plurality of space portions,
  wherein the air-conditioning case includes a first door disposed in a third space portion among the plurality of space portions and disposed at an outlet side of the heating heat exchanger,
  wherein the first door adjusts an opening amount of the heating heat exchanger in the third space portion, and
  wherein the air-conditioning case includes a second door disposed at an inlet side of the heating heat exchanger in the second space portion, and the first door and the second door are connected to one driving unit including a motor to move together.

2. The air-conditioning apparatus according to claim 1, wherein the air-conditioning case includes a first flow path which is disposed below the heating heat exchanger in a vertical direction and through which air not passing through the heating heat exchanger flows.

3. The air-conditioning apparatus according to claim 2, wherein, when the second door fully opens the inlet side of the heating heat exchanger and closes the first flow path, the first door fully opens the outlet side of the heating heat exchanger.

4. The air-conditioning apparatus according to claim 2, wherein, when the second door fully closes the inlet side of the heating heat exchanger and fully opens the first flow path, the first door is controlled so that the first door fully opens the outlet side of the heating heat exchanger.

5. The air-conditioning apparatus according to claim 2, wherein, when the second door partially closes the inlet side of the heating heat exchanger and partially opens the first flow path, the first door partially opens the outlet side of the heating heat exchanger.

6. The air-conditioning apparatus according to claim 2, wherein the first door is disposed to adjust an opening amount of the first flow path together with an opening amount of the outlet side of the heating heat exchanger in the third space portion.

7. The air-conditioning apparatus according to claim 6, wherein the first door includes a first shaft portion and a door body coupled to be rotated about the first shaft portion, and the door body includes an upper surface, a lower surface, and a side surface connecting the upper surface to the lower surface to form an accommodating space therein.

8. An air-conditioning apparatus for a vehicle, comprising:
  an air-conditioning case including an inlet, an outlet, and a first partition wall configured to partition an inner space into a first space portion and a second space portion;
  a cooling heat exchanger disposed inside the air-conditioning case and crossing the first space portion and the second space portion; and
  a heating heat exchanger disposed inside the air-conditioning case and crossing the first space portion and the second space portion,
  wherein the air-conditioning case includes a second partition wall configured to partition the second space portion into a plurality of space portions,
  wherein the air-conditioning case includes a first door disposed in a third space portion among the plurality of space portions and disposed at an outlet side of the heating heat exchanger,
  wherein the first door adjusts an opening amount of the heating heat exchanger in the third space portion, and
  wherein the plurality of space portions include the third space portion, a fourth space portion, and a fifth space portion, which are partitioned in a lateral direction of the air-conditioning apparatus, and the third space portion is disposed between the fourth space portion and the fifth space portion.

* * * * *